United States Patent
Lai et al.

(10) Patent No.: US 10,144,645 B1
(45) Date of Patent: Dec. 4, 2018

(54) METHOD FOR PREPARING SPHERICAL ALUMINUM OXYNITRIDE POWDER

(71) Applicant: NATIONAL CHUNG SHAN INSTITUTE OF SCIENCE AND TECHNOLOGY, Taoyuan (TW)

(72) Inventors: Kuan-Ting Lai, Taoyuan (TW); Chun-Te Wu, Taoyuan (TW); Cheng-Hung Shih, Taoyuan (TW); Yang-Kuo Kuo, Taoyuan (TW); Lea-Hwung Leu, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 14 days.

(21) Appl. No.: 15/661,045

(22) Filed: Jul. 27, 2017

(51) Int. Cl.
    *C01B 21/082* (2006.01)

(52) U.S. Cl.
    CPC ...... *C01B 21/0825* (2013.01); *C01P 2004/32* (2013.01)

(58) Field of Classification Search
    None
    See application file for complete search history.

(56) References Cited

U.S. PATENT DOCUMENTS 8,211,356 B1 * 7/2012 Hartnett ............. C04B 35/115
264/663

FOREIGN PATENT DOCUMENTS

| CN | 101928145 A | 12/2010 |
|---|---|---|
| CN | 102180675 A | 9/2011 |
| CN | 105622104 A | 6/2016 |
| CN | 105837222 A | 8/2016 |

OTHER PUBLICATIONS

Wang et al.; Synthesis of teaches γ-AlON Powders by Combinational Method of Carbothermal Reduction and Solid-State Reaction; J. Am. Ceram. Soc.; 93[1], 22-24; 2010.*

* cited by examiner

*Primary Examiner* — Guinever S Gregorio
(74) *Attorney, Agent, or Firm* — Schmeiser, Olsen & Watts, LLP

(57) ABSTRACT

A method for preparing spherical aluminum oxynitride powder, comprising the steps of (A) providing an alumina powder and a resin, both of which are then dispersed and dissolved in a solvent to form a mixed slurry; (B) subjecting the mixed slurry to spray drying to form a spherical powder; (C) subjecting the spherical powder to a carbonization treatment under an inert atmosphere to form a carbonized spherical powder; (D) subjecting the carbonized spherical powder to carbothermic reduction in a nitrogen-containing atmosphere at a temperature of 1450° C. to 1550° C.; (E) keeping the spherical powder that has been subjected to carbothermic reduction in the nitrogen-containing atmosphere to carry out a nitridation reaction at a temperature of 1700° C. to 1730° C., forming a nitrided spherical aluminum oxynitride powder; (F) subjecting the nitrided spherical aluminum oxynitride powder to decarbonization in an oxygen-containing atmosphere to form the spherical aluminum oxynitride powder.

10 Claims, 5 Drawing Sheets

METHOD FOR PREPARING SPHERICAL ALUMINUM OXYNITRIDE POWDER

FIELD OF THE INVENTION

The present invention relates to a method for preparing aluminum oxynitride powder, and more particularly to a method for preparing spherical aluminum oxynitride powder.

BACKGROUND OF THE INVENTION

Aluminum oxynitride of cubic spinel type (γ-AlON) is $Al_2O_3$—AlN having a structure of stable single-phase and cubic solid solution, and belongs to the transparent polycrystalline ceramic. It has a hardness of 17.7 GPa and a strength of 380 MPa, which is second to the single crystal sapphire only. As compared with the single crystal, γ-AlON has better moldability and is easier to be prepared into components with large size and different shapes. γ-AlON has a melting point higher than that of alumina, and thus possesses good high temperature resistance, thermal stability and corrosion resistance, thereby being an ideal structural ceramic and refractory material. γ-AlON has good transmittancy in the range of UV-visible and mid-infrared light (transmittance >80% at a wavelength of 0.2 to 5 μm), and, therefore, has great potential for applications of infrared high temperature-resistant windows, bulletproof armor materials, and fairings.

Conventionally, the synthesis of aluminum oxynitride powder is mainly performed by solid-state reaction as well as carbothermic reduction and nitridation. The solid phase reaction employs solid phase mixing of alumina and aluminum nitride, which is a simple pathway of synthesis, however, the synthesis temperature needs to be higher than 1750° C. In addition, the price of aluminum nitride raw material is high and will lead to increased cost in mass production, and aluminum nitride is prone to hydrolysis reaction with water. The method of carbothermic reduction and nitridation uses alumina and carbon powder as raw materials, and the aluminum oxynitride powder obtained therefrom is high in purity and low in cost, which makes the method suitable for industrial mass production.

When the method of carbothermic reduction and nitridation is applied to prepare the high-purity aluminum oxynitride powder, the carbon powder and the alumina particles cannot be contacted sufficiently and are difficult to be uniformly mixed, since the reactant is a mixture of solids. While the mass production is carried out and the buildup height thereof is increased, it is not easy for the nitrogen gas to access and perform the nitridation reaction, resulting in the issue of incomplete reaction. The aluminum oxynitride powder synthesized by the method of carbothermic reduction and nitridation is grayish-white or grayish-black, because the aluminum oxynitride (AlON) powder is in a thermodynamically unstable state at a temperature below 1650° C. Therefore, the synthesis temperature is required to be higher than 1650° C., and even between 1750° C.-1825° C. to force the aluminum oxynitride powder of pure phase to be produced. However, at this temperature, it is easy to cause local sintering and agglomeration of the adjacent alumina powder. Conventional method of carbothermic reduction and nitridation has a high reaction temperature and a long reaction time, which will make the particle size of the powder become larger, and make it difficult to obtain aluminum oxynitride powder of a small particle size.

The synthesis of aluminum oxynitride powder feedstocks has a significant effect on the transparency and optical properties of the aluminum oxynitride ceramics. It is needed to use the aluminum oxynitride powder of high purity, uniform distribution, and small particle size as the raw material to facilitate the improvement of the degree of denseness for aluminum oxynitride green and the densification by sintering, and then forming the aluminum oxynitride ceramic having ideal transparency and optical properties. As described in China Patent Publication No. 105837222, the aluminum oxynitride powder of single phase was obtained by employing the sol-gel method. The sol-gel method used aluminum isopropoxide and nano-carbon black as the raw materials, and adds a stabilizer (tetrahydrofuran) mixed with a dispersant (PEG) to obtain a precursor through hydrolysis. The precursor was allowed to stand for 20 hours, dried, milled, sieved, and then subjected to carbothermic reduction at 1650° C. to 1700° C. for 2 hours to obtain the aluminum oxynitride powder of single phase having a uniform distribution of particle size and a particle size of less than 3 μm. However, in China Patent Publication No. 105837222, the preparation of the colloidal precursor was complicated in process and time consuming. As to China Patent Publication No. 101928145, the aluminum oxynitride powder of single phase was prepared using highly active γ-$Al_2O_3$ and carbon source (carbon black and nano bamboo charcoal powder) feedstocks by wet high-energy ball milling in combination with the method of carbothermic reduction and nitridation. However, the aluminum oxynitride powder obtained in China Patent Publication No. 101928145 aggregated seriously, and needed long time of wet high-energy ball milling to become aluminum oxynitride powder having a uniform distribution of small particle size (less than 1 μm). China Patent Publication No. 105622104 formed a slurry by ball milling, mixing, and dispersing the activated carbon powder having a particle size of 10 to 100 nm with γ-$Al_2O_3$ and a dispersing agent in a pure water for 10 to 36 hours. Subsequently, the mixed powder was obtained by freeze-drying and slow temperature rise for 10 hours. Afterwards, aluminum oxynitride powder having a particle size of less than 2 μm was obtained by rising the temperature to 1700° C. to 1800° C. in a nitrogen atmosphere and keeping for 1 to 2 hours. However, a longer drying time was needed due to the slow sublimation of water at low temperature of the freeze-drying technology. China Patent Publication No. 102180675 utilized aluminum nitrate, urea and nano-carbon black as raw materials, PEG as the dispersant, and ammonium bicarbonate and aqueous ammonia as the precipitant to prepare a precursor by coprecipitation, and then the precursor was precipitated for 24 hours, washed, oven dried, milled, and kept at 1750° C. for 2-4 hours in nitrogen to obtain pure phase aluminum oxynitride, of which the particle size was less than 4 μm. However, China Patent Publication No. 102180675 prepared a precursor by using a coprecipitation method, which is long in precipitation time and cumbersome in process. The method for preparing aluminum oxynitride described above needed a mixing and drying time of up to 10 to 20 hours, resulting in difficult cost control, and therefore cannot be realized in industrial mass production.

Therefore, the industry needs a method for preparing spherical aluminum oxynitride powder, which can employ low cost alumina and carbonaceous material as raw materials, with the use of a simple, energy saving and time-saving process to produce spherical aluminum nitride powder that meets the industrial needs.

SUMMARY OF THE INVENTION

In view of the disadvantages of the conventional techniques described above, it is a principal object of the present invention to provide a method for preparing spherical aluminum oxynitride powder, the process of which comprises the steps of raw materials mixing, spray drying, carbonization, carbothermic reduction, nitridation reaction, and decarbonization to produce the spherical aluminum oxynitride powder having good properties.

In the spray-drying treatment employed by the present invention, the mixed slurry containing the raw materials is atomized in a high-speed rotation manner to produce a thin layer of resin on the surface of alumina. The drying process producing dried spherical solid powder is rapid. The carbothermic reduction and nitridation reaction of the present invention can be carried out continuously by a two-step temperature rise process in order to obtain spherical aluminum oxynitride powder directly, so that the process of spherical aluminum oxynitride has an improvement of considerable economic significance. The spherical aluminum oxynitride powder can be widely used in the molding (dry pressing and grouting) of aluminum oxynitride ceramic and applied to infrared ray high temperature-resistant window, bulletproof armor materials, fairings and the like.

In order to achieve the above object, according to one scheme proposed by the present invention, there is provided a method for preparing spherical aluminum oxynitride powder, comprising the steps of: (A) providing an alumina powder and a resin, both of which are then dispersed and dissolved in a solvent to form a mixed slurry; (B) subjecting the mixed slurry to spray drying to form a spherical powder; (C) subjecting the spherical powder to a carbonization treatment under an inert atmosphere to form a carbonized spherical powder; (D) subjecting the carbonized spherical powder to carbothermic reduction in a nitrogen-containing atmosphere at a temperature of 1450° C. to 1550° C.; (E) keeping the spherical powder that has been subjected to carbothermic reduction in the nitrogen-containing atmosphere to carry out a nitridation reaction at a temperature of 1700° C. to 1730° C., forming a nitrided spherical aluminum oxynitride powder; (F) subjecting the nitrided spherical aluminum oxynitride powder to decarbonization in an oxygen-containing atmosphere.

At step (A) described above, the crystal structure of the alumina powder is selected from the group consisting of α-alumina phase, γ-alumina phase, δ-alumina phase, or the combinations thereof. The resin described is selected from the group consisting of a phenolic resin, an epoxy resin, a polyester resin, polymethylmethacrylate, polytetrafluoroethylene, and a melamine-formaldehyde resin. The solvent mentioned is selected from the group consisting of water, methanol, ethanol, isopropanol, n-butanol or aqueous acetone. The weight ratio of the alumina powder to the resin is 1:0.05 to 1:0.25. The mixed slurry is mixed by stirring or ball milling.

The carbonization treatment at step (C) is carried out at a temperature of 500° C. to 700° C. At step (D), the time for carbothermic reduction is 1 to 5 hours, and the nitrogen-containing atmosphere is pure nitrogen, a mixed gas of nitrogen and hydrogen, or a mixed gas of nitrogen and ammonia. The time for the nitridation reaction at step (E) is 1 to 5 hours. The nitrogen-containing atmosphere is pure nitrogen, a mixed gas of nitrogen and hydrogen, or a mixed gas of nitrogen and ammonia.

The present invention is a method for preparing the spherical aluminum oxynitride powder, which is characterized in that the raw materials with lower cost are used. The carbonaceous resin and alumina powder are subjected to spray-drying so that the resin forms a thin layer on the surface of alumina, resulting in uniformly mixed spherical powder of tens of micrometers having a large specific surface area. The resin forms a highly active porous material after carbonization, and thus has an increased surface area of contact with alumina. By two-step temperature rise, the carbothermic reduction and nitridation reaction are performed successively to obtain the spherical aluminum oxynitride powder directly. Therefore, the process of the present invention is both simple and energy-saving.

The above summary and the following detailed description and accompanying drawings are all intended to further illustrate the manner and means adopted by the present invention to achieve the intended purposes, and the efficacy of the present invention. Other objects and advantages of the present invention will be set forth in the following description and drawings.

DETAILED DESCRIPTION OF THE PREFERRED EMBODIMENTS

Hereinafter, implementations of the present invention will be illustrated by particular and specific examples, and the advantages and efficacy of the present invention will be readily understood by those skilled in the art from the disclosure of the present specification.

The method for preparing spherical aluminum oxynitride powder of the present invention coats the surface of alumina powder uniformly with the carbonaceous resin by spray drying. After once carbonization, the powder is uniformly mixed and the heat treatment is carried out through a two-step method, which performs the carbothermic reduction reaction at 1450° C. to 1550° C. and then the nitridation reaction of the powder at a high temperature of 1700° C. to 1730° C. The nitrided powder is then subjected to the decarbonization operation in an oxygen-containing environment to produce spherical aluminum oxynitride powder. The carbothermic reduction reaction coats the surface of the alumina powder by resin, and the carbonized resin component is used as a reducing agent to reduce the alumina under a nitrogen-containing atmosphere into a small amount of aluminum nitride, which is then reacted with aluminum oxide to produce aluminum oxynitride powder.

Figure 1:
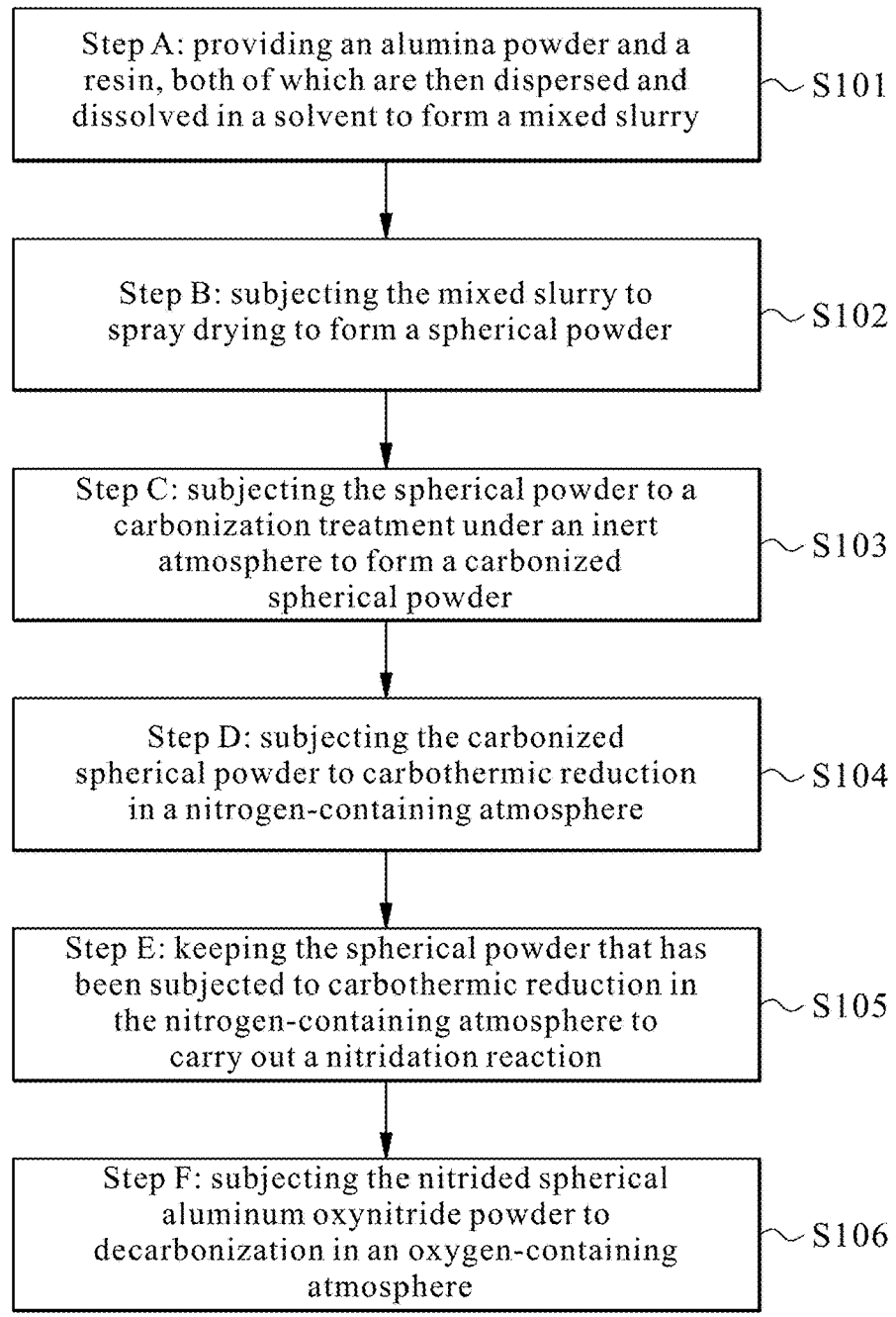
FIG. 1 is a flow chart of a method for preparing spherical aluminum oxynitride powder of the present invention.

Reference is made to FIG. 1, which is a flow chart of a method for preparing spherical aluminum oxynitride powder of the present invention. As shown in the drawing, the method for preparing spherical aluminum oxynitride powder of the present invention comprises the steps of: (A) providing an alumina powder and a resin, both of which are then dispersed and dissolved in a solvent to form a mixed slurry S101; (B) subjecting the mixed slurry to spray drying to form a spherical powder S102; (C) subjecting the spherical powder to a carbonization treatment under an inert atmosphere to form a carbonized spherical powder S103; (D) subjecting the carbonized spherical powder to carbothermic reduction in a nitrogen-containing atmosphere at a temperature of 1450° C. to 1550° C. S104; (E) keeping the spherical powder that has been subjected to carbothermic reduction in the nitrogen-containing atmosphere to carry out a nitridation reaction at a temperature of 1700° C. to 1730° C., forming a nitrided spherical aluminum oxynitride powder S105; (F) subjecting the nitrided spherical aluminum oxynitride powder to decarbonization in an oxygen-containing atmosphere S106.

In the method described above, the crystal structure of the alumina powder is selected from the group consisting of α-alumina phase, γ-alumina phase, δ-alumina phase, or the combinations thereof. The resin material can be selected from the group consisting of a phenolic resin, an epoxy resin, a polyester resin, polymethylmethacrylate, polytetrafluoroethylene, and a melamine-formaldehyde resin. The solvent may be selected from the group consisting of water, methanol, ethanol, isopropanol, n-butanol or aqueous acetone. In terms of raw materials mixing, the weight ratio of the alumina powder to the resin ranging from 1:0.05 to 1:0.25 may be employed. The mixed slurry may be mixed by stirring or ball milling.

Example 1

Figure 2:
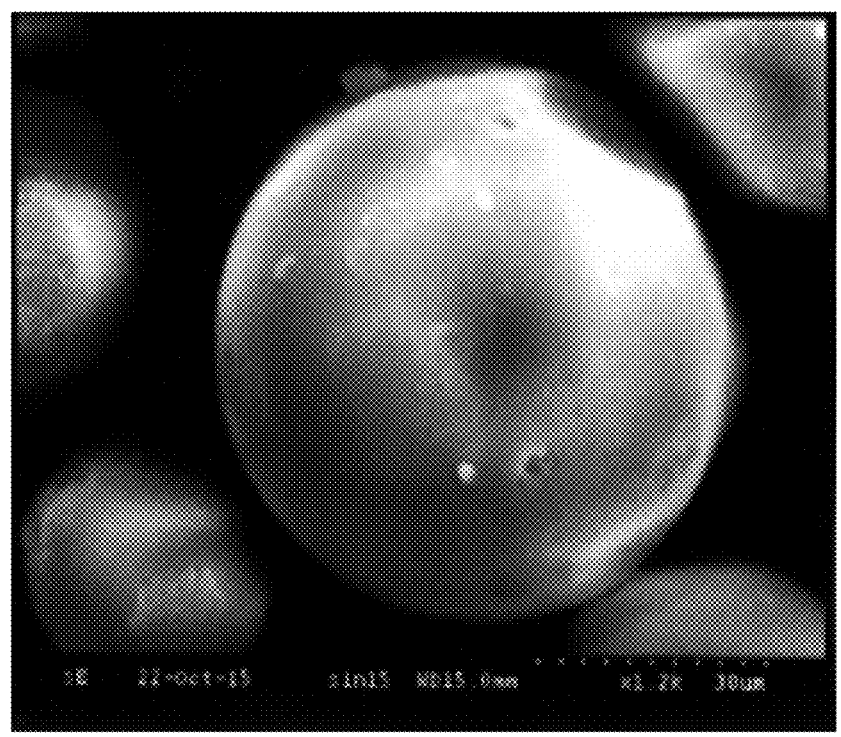
FIG. 2 is the scanning electron micrograph of the spherical powder after spray drying in accordance with an embodiment of the present invention.
Figure 3:
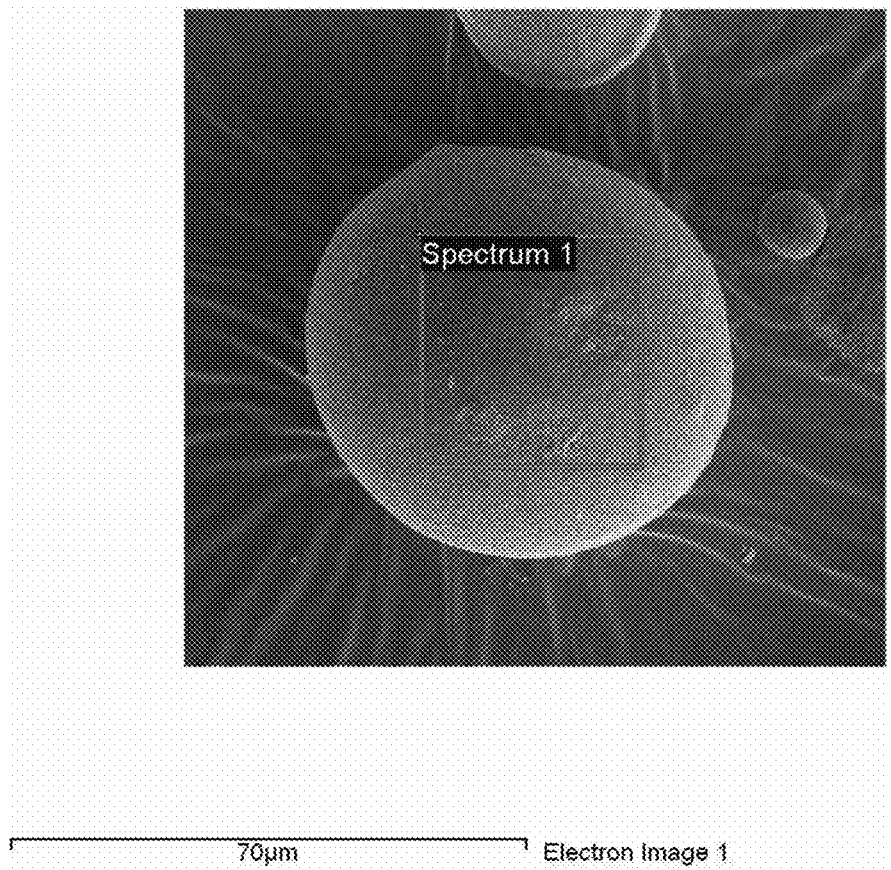
FIG. 3 is the scanning electron micrograph of the carbonized spherical powder after the carbonization treatment in accordance with an embodiment of the present invention.
Figure 4:
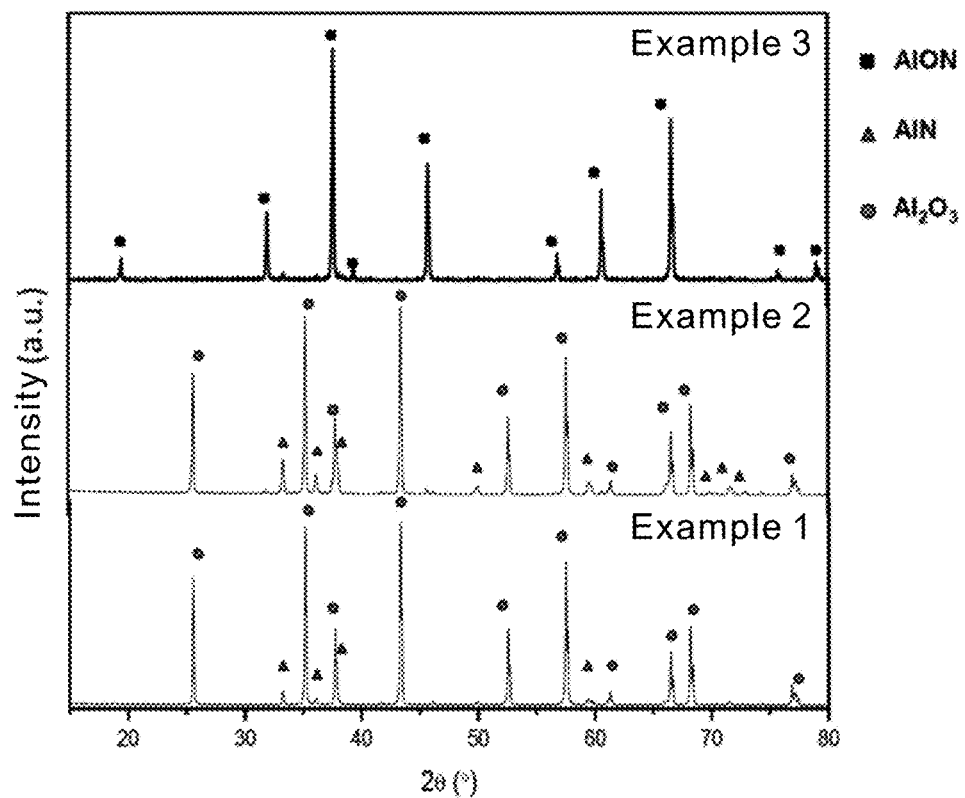
FIG. 4 is the X-ray powder diffraction pattern of an embodiment of the present invention.

100 grams of γ-alumina powder was placed in 1000 ml of ethanol to form a dispersion solution, and, separately, 10 grams of phenol resin was dissolved in 1000 ml of ethanol to form a resin solution. Subsequently, both solutions described above were mixed homogeneously to form a mixed slurry. Afterwards, the mixed slurry was spray-dried by the atomizer at a rotational speed of 10,000 rpm to form the spherical powder. Referring to FIG. 2, which is a scanning electron micrograph of the spray dried spherical powder of an embodiment of the present invention. As shown in the figure, the spray dried powder is spherical in shape, and is spherical powder of tens of micrometers. After that, the resultant spherical powder was placed in the boron nitride crucible (BN crucible) and subjected to carbonization treatment at 700° C. under nitrogen atmosphere in the high temperature furnace for 2 hours to form the carbonized spherical powder. With reference to FIG. 3, there is a scanning electron micrograph of the spherical powder after the carbonization treatment according to an embodiment of the present invention. The carbonized spherical powder was further heated at a rate of 10° C./min, held at 1450° C. for 2 hours, and subjected to carbothermic reduction under the atmosphere of nitrogen or mixed gases of nitrogen and hydrogen in the high-temperature furnace. Referring to FIG. 4, which is an X-ray powder diffraction pattern of an embodiment of the present invention. As shown in the figure, after the carbothermic reduction at 1450° C. for 2 hours, the powder of Example 1 exhibited a small amount of aluminum nitride phase and α-alumina (Alfa phase-alumina).

Example 2

100 grams of γ-alumina powder was placed in 1000 ml of ethanol to form a dispersion solution, and, separately, 10 grams of phenol resin was dissolved in 1000 ml of ethanol to form a resin solution. Subsequently, both solutions described above were mixed homogeneously to form a mixed slurry. Afterwards, the mixed slurry was spray-dried by the atomizer at a rotational speed of 15,000 rpm to form the spherical powder. After that, the resultant spherical powder was placed in the boron nitride crucible (BN crucible) and subjected to carbonization treatment at 700° C. under nitrogen atmosphere in the high temperature furnace for 2 hours to form the carbonized spherical powder. The carbonized spherical powder was further heated at a rate of 10° C./min, held at 1550° C. for 2 hours, and subjected to carbothermic reduction under the atmosphere of nitrogen or mixed gases of nitrogen and hydrogen in the high-temperature furnace. Referring to FIG. 4, which is an X-ray powder diffraction pattern of an embodiment of the present invention. As shown in the figure, after the carbothermic reduction at 1550° C. for 2 hours, the powder of Example 2 exhibited the mixed phase of a small amount of aluminum nitride and α-alumina (Alfa phase-alumina).

Example 3

Figure 5:
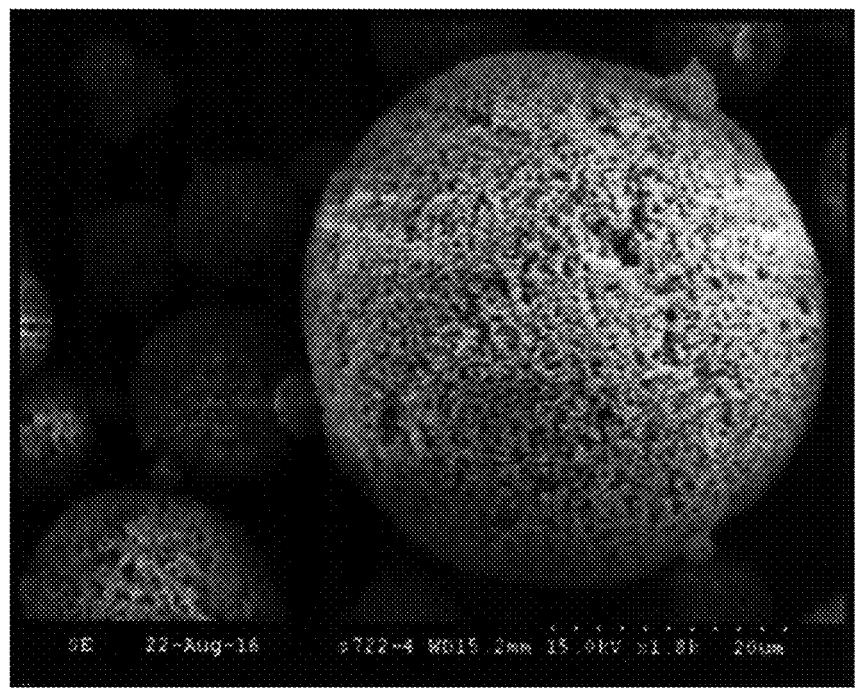
FIG. 5 is the scanning electron micrograph of the spherical aluminum oxynitride powder after carbothermic reduction and nitridation reaction in accordance with an embodiment of the present invention.

100 grams of γ-alumina powder was placed in 1000 ml of ethanol to form a dispersion solution, and, separately, 10 grams of phenol resin was dissolved in 1000 ml of ethanol to form a resin solution. The weight ratio of alumina to phenol resin was 1:0.1. Subsequently, both solutions described above were mixed homogeneously to form a mixed slurry. Afterwards, the mixed slurry was spray-dried by the atomizer at a rotational speed of 13,000 rpm to form the spherical powder. After that, the resultant spherical powder was placed in the boron nitride crucible (BN crucible) and subjected to carbonization treatment at 700° C. under nitrogen atmosphere in the high temperature furnace for 2 hours to form the carbonized spherical powder. The carbonized spherical powder was heated at a rate of 10° C./min, held at 1550° C. for 2 hours, and subjected to carbothermic reduction under the atmosphere of nitrogen or mixed gases of nitrogen and hydrogen in the high-temperature furnace. Afterwards, the temperature was further risen to 1700° C. and kept for 3 hours to perform the nitridation reaction, thereby forming the spherical aluminum oxynitride powder. Referring to FIG. 5, which is a scanning electron micrograph of the spherical aluminum oxynitride powder after carbothermic reduction and nitridation reaction according to an embodiment of the present invention. As shown in the figure, after two-step temperature rise, the powder exhibited a ball shape with a particle size of 20 to 40 μm. With reference to FIG. 4, there is an X-ray powder diffraction pattern of an embodiment of the present invention. As shown in the figure, the powder obtained through the preparation exhibited single pure phase of aluminum oxynitride, confirming that the spherical aluminum oxynitride powder had been prepared. Finally, the decarbonization operation was carried out in air at a temperature of 580° C. for 5 hours to obtain the decarbonized spherical aluminum oxynitride powder.

As compared with the conventional carbothermic reduction, the preparation method of the present invention uses the carbonaceous resin instead of the carbon black system, and the carbonaceous resin is uniformly coated on the surface of the alumina powder by spray drying so that after once carbonization the resin and alumina powder are uniformly mixed and the reaction temperature of the carbothermic reduction can be significantly reduced, i.e. the aluminum nitride phase can be synthesized at a temperature range of less than 1550° C. Through the uniform mixing of resin and alumina powder, the resin coating the outer layer of the alumina powder prevents the alumina powder from aggregating at high temperature, resulting in high dispersibility and high flowability. The mixing of raw materials and the process of atomization and granulation are rapid, so that the spherical aluminum oxynitride powder of tens of micrometers can be mass produced after nitridation. The resultant spherical aluminum oxynitride powder can be widely used in the molding of aluminum oxynitride ceramic and applied to infrared ray high temperature-resistant window, bulletproof armor materials, fairings and the like. Therefore, the preparation method of the present invention is simple in process, low in production cost, economical, and energy-saving, and thus will have a wider application field in the future.

The embodiments described above are merely exemplary and illustrative of the features and efficacy of the present invention and are not intended to limit the scope of the essential technical contents of the present invention. Modifications and variations may be made to the above embodiments by any person skilled in the art without departing from the spirit and scope of the invention. Accordingly, the scope of the present invention should be as the claims set forth below.

What is claimed is:

1. A method for preparing spherical aluminum oxynitride powder, comprising the steps of:
   (A) providing an alumina powder and a resin, both of which are then dispersed and dissolved in a solvent to form a mixed slurry;
   (B) subjecting the mixed slurry to spray drying to form a spherical powder;
   (C) subjecting the spherical powder to a carbonization treatment under an inert atmosphere to form a carbonized spherical powder;
   (D) subjecting the carbonized spherical powder to carbothermic reduction in a nitrogen-containing atmosphere at a temperature of 1450° C. to 1550° C.;
   (E) keeping the spherical powder that has been subjected to carbothermic reduction in the nitrogen-containing atmosphere to carry out a nitridation reaction at a temperature of 1700° C. to 1730° C., forming a nitrided spherical aluminum oxynitride powder;
   (F) subjecting the nitrided spherical aluminum oxynitride powder to decarbonization in an oxygen-containing atmosphere.

2. The method for preparing spherical aluminum oxynitride powder of claim 1, wherein the crystal structure of the alumina powder is selected from the group consisting of α-alumina phase, γ-alumina phase, δ-alumina phase, or the combinations thereof.

3. The method for preparing spherical aluminum oxynitride powder of claim 1, wherein the resin is selected from the group consisting of a phenolic resin, an epoxy resin, a polyester resin, polymethylmethacrylate, polytetrafluoroethylene, and a melamine-formaldehyde resin.

4. The method for preparing spherical aluminum oxynitride powder of claim 1, wherein the solvent is selected from the group consisting of water, methanol, ethanol, isopropanol, n-butanol or aqueous acetone.

5. The method for preparing spherical aluminum oxynitride powder of claim 1, wherein the weight ratio of the alumina powder to the resin is 1:0.05 to 1:0.25.

6. The method for preparing spherical aluminum oxynitride powder of claim 1, wherein the mixed slurry is mixed by stirring or ball milling at step (A).

7. The method for preparing spherical aluminum oxynitride powder of claim 1, wherein the carbonization treatment at step (C) is carried out at a temperature of 500° C. to 700° C.

8. The method for preparing spherical aluminum oxynitride powder of claim 1, wherein the time for carbothermic reduction at step (D) is 1 to 5 hours.

9. The method for preparing spherical aluminum oxynitride powder of claim 1, wherein the time for the nitridation reaction at step (E) is 1 to 5 hours.

10. The method for preparing spherical aluminum oxynitride powder of claim 1, wherein the nitrogen-containing atmosphere at step (D) and step (E) is pure nitrogen, a mixed gas of nitrogen and hydrogen, or a mixed gas of nitrogen and ammonia.

* * * * *